United States Patent [19]

Berg

[11] 4,132,384

[45] Jan. 2, 1979

[54] AUXILIARY POWER SYSTEM AND APPARATUS

[76] Inventor: John W. Berg, Space #35, 1111 Morse Ave., Sunnyvale, Calif. 94086

[21] Appl. No.: 749,818

[22] Filed: Dec. 13, 1976

Related U.S. Application Data

[60] Division of Ser. No. 630,415, Nov. 10, 1975, Pat. No. 4,031,705, which is a continuation-in-part of Ser. No. 524,262, Nov. 15, 1974, abandoned.

[51] Int. Cl.² ............................................. F16K 31/10
[52] U.S. Cl. ................................. 251/129; 251/138; 335/261
[58] Field of Search ...................... 251/129, 138, 141; 335/279, 258, 261, 280, 297, 279

[56] References Cited

U.S. PATENT DOCUMENTS

| 1,236,177 | 8/1917 | Jacobs | 335/261 X |
|---|---|---|---|
| 1,460,517 | 7/1923 | Stevens | 335/261 |
| 3,168,242 | 2/1965 | Diener | 251/129 X |
| 3,805,203 | 4/1974 | Deckard | 251/129 X |
| 3,914,952 | 10/1975 | Barbier | 251/129 X |

FOREIGN PATENT DOCUMENTS

820952  8/1937  France ..................................... 251/129

Primary Examiner—Arnold Rosenthal
Attorney, Agent, or Firm—Owen, Wickersham & Erickson

[57] ABSTRACT

A solenoid valve for fluid flow control, in which the solenoid has an armature movable within a core in response to current in a field coil. The armature is shaped as a cone with a hemispherical end so as to give a power output that is a substantially linear function of said current. Valve control means connects a valve member to the armature for moving the valve member to and from a valve seat to control fluid flow therethrough.

2 Claims, 9 Drawing Figures

AUXILIARY POWER SYSTEM AND APPARATUS

RELATED PATENT APPLICATIONS

This is a division of application Ser. No. 630,415 filed Nov. 10, 1975, now U.S. Pat. No. 4,031,705, which was a continuation-in-part of application Ser. No. 524,262 filed Nov. 15, 1974, now abandoned.

BACKGROUND OF THE INVENTION

The present invention is related to a novel solenoid valve, with application in general to auxiliary power systems. For example, it may be used in an auxiliary power system employing a vapor engine for assisting in driving a primary engine, such as an internal combustion engine and the like, using available heat, typically generated by the primary engine.

Internal combustion engines are probably the largest single user of petroleum and its products. Mainly, these engines are used in automobiles and trucks, although many in stationary form are used in industry. Power plant engineers have long been aware that the internal combustion engine is relatively inefficient compared to other power sources such as electric motors. Moreover, presently the overall efficiency of automobile and truck engines is being decreased even more by requirements for emission controls in order to protect the environment. It is common, for example, for present automobile engines to operate at an overall efficiency of approximately 15 percent, and in many cases even lower.

Textbooks concerned with today's internal combustion engines indicate that out of the total power available in the fuel consumed, approximately 30 percent of the energy (gross) actually produces power, approximately 30 percent goes out the exhaust pipe in the form of waste heat, and approximately another 30 percent is lost through the radiator and the cooling system in the form of waste heat. About 10 percent is used for engine accessories such as the fan, alternator, transmission, etc. Of the 30 percent of the heat energy that produces power, actually, only about half reaches the road, in cases where the engine is driving a car or truck. Because literally millions of automobiles and trucks in use in the world at the present time consume hundreds of millions of gallons of gasoline and diesel fuel annually, obviously, an improvement in the overall efficiency of the internal combustion engine is very meaningful.

Heretofore, a number of proposals have been made for increasing the efficiency of an internal combustion engine using steam power generated from the heat of the internal combustion engine. In a number of such proposals, a piston driven by steam is connected directly to the same crankshaft as the pistons in the internal combustion cylinders. This type of arrangement is complex, costly to manufacture and is itself inefficient in that it presents an additional load on the internal combustion engine due to friction when insufficient steam is generated to drive the steam pistons or is valved from the steam cylinders as during idling. Also, the arrangement is not readily adaptable to existing internal combustion engines. Further, the use of steam must rely principally on the heat in the exhaust system and largely neglects the heat lost in the radiator system.

In another prior known proposal, a separate steam engine is described as being coupled, as by a universal jointed shaft, to the crankshaft of an internal combustion engine. Gauges and the like are provided for measuring the steam pressure and water temperature and manual valving means are provided for controlling the steam flow to the steam engine. Safety valve means are also provided for venting steam to the atmosphere when excessive steam pressure develops in the system.

While more easily adaptable to existing internal combustion engines than the previously described prior known arrangements, the latter system also suffers from certain undesirable inefficiencies. The use of a universal jointed shaft and the like for coupling the steam engine directly to the crankshaft of the internal combustion engine, for example, will also result in loading down the internal combustion engine at times when the steam engine is developing insufficient output power to drive the internal combustion engine. The use of gauges and manual steam control valves provides for further inefficiencies in that they require the attention of the operator which is distracting particularly when the system is employed to power a motor vehicle. The nature of the safety valve means employed in this arrangement is also undesirable in that it is necessary to replenish the water lost during blow-off. Clearly, therefore, a fully automatic closed auxiliary system which is relatively inexpensive, and readily adaptable to existing internal combustion engines, is preferable.

An object of the invention is to provide a solenoid valve for use in a control array for a system having a primary engine and an auxiliary vapor engine operating from normally wasted heat of the primary engine, so that the flow of fluid to the vapor engine is governed by the temperature of the cooling circuit for the primary engine, including the initiation of such flow only after the primary engine has been warmed sufficiently for its basic efficiency.

Another object of the invention is to provide a solenoid valve, wherein the armature is shaped so as to give a power output that is a substantially linear function of the current through the field coil.

SUMMARY OF THE INVENTION

The invention provides a novel valving means for automatically controlling the flow of fluid through the heat exchanger. Coupled to the fluid reservoir in a fluid recirculation path for recirculating the fluid through the reservoir is a solenoid controlled valve with linear output characteristics.

Control of the solenoid valve may be provided by one or more temperature-sensitive elements. In a system employing a liquid cooled internal combustion engine, one of the elements may be used to detect the temperature of the coolant. Another element may be used for detecting the temperature of the fluid in the heat exchanger coupled to the exhaust system. Still others may be employed to monitor either the temperature of the cooling liquids, if any, used to cool accessories, or the temperature of the fluid to be vaporized in the heat exchanger coupled thereto. In each case, the temperature-sensitive elements produce an output signal proportional to the temperature detected. An amplifier is preferably provided to amplify the output signal and provide an amplified output signal for driving the solenoid controlled valve.

A feature of the solenoid valve is a novel flared armature which provides for control of the position of the armature as a linear function of the output of the amplifier. This is in contrast to the normal snap action of solenoid valves.

In the preferred operation, the solenoid controlled valve is normally open so as to recirculate fluid through the reservoir and, thereby, provide for fast warm-up of the internal combustion engine. As the temperature of the internal combustion engine rises, the valve closes. Closing of the valve decreases the flow of recirculating fluid and increases the back pressure. A pressure relief valve is provided for controlling the fluid flow through the heat exchangers and opens when the back pressure in the recirculation path reaches a predetermined magnitude. By means of the solenoid controlled valve and the pressure relief valve, an amount of vapor is generated which is proportional to the operating temperatures of the internal combustion engine. When, for example, in a motor vehicle, a hill or steep grade is encountered, the temperature will rise causing a corresponding increase in the fluid flow through the heat exchangers and a corresponding increase in the power output of the vapor engine. At the same time, the increased fluid flow helps to maintain the temperatures of the internal combustion engine within their operational limitations. The converse operation of the valves occurs when the power requirements on the vehicle decrease. Thus, auxiliary power is provided as and when needed.

Other objects, advantages, and features of the invention will appear from the following description of some preferred embodiments.

DESCRIPTION OF SOME PREFERRED EMBODIMENTS

Figure 1:
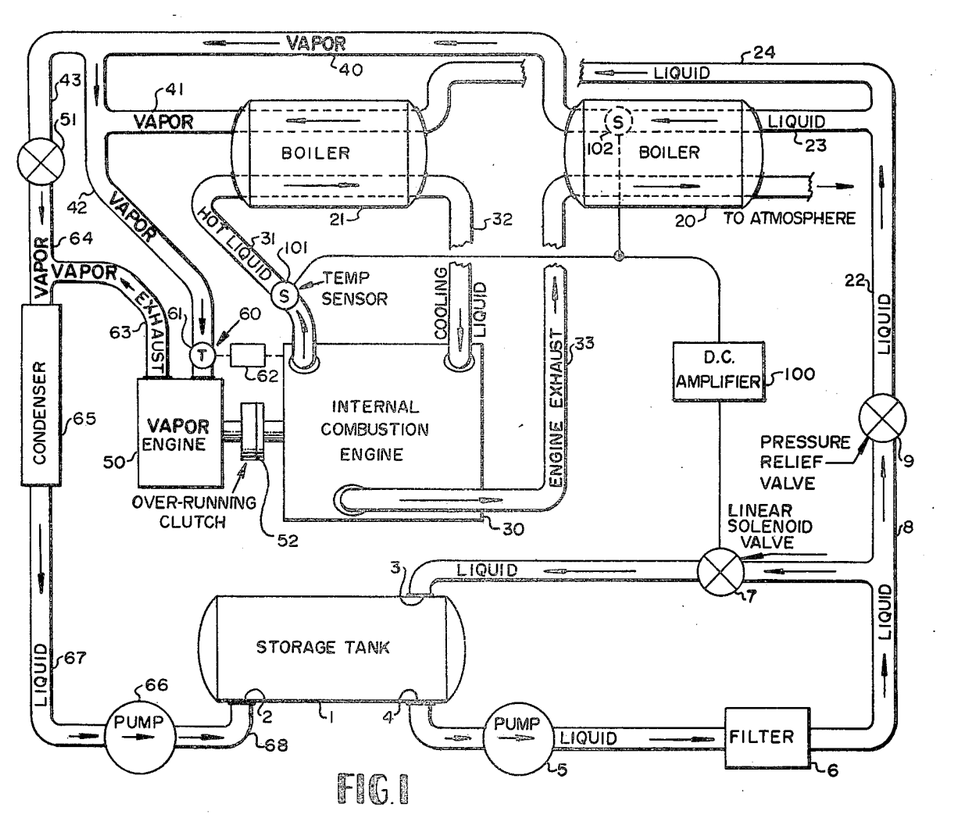
FIG. 1 is a schematic diagram of a system providing a combination of an auxiliary power system with an internal combustion engine in accordance with the principles of the invention.

The System of FIG. 1

FIG. 1 shows a storage tank or reservoir 1 for containing an adequate supply of a fluid having a relatively low boiling point, preferably well below that of water, such as methanol or one having, in addition, a degree of lubricity, such as FREON mixed with a compatible lubricant. Either fluid or similar fluids may be used. The system is closed to the atmosphere; so fluids having the lubricity characteristics of FREON mixed with a lubricant are preferred for internal lubrication of the moving parts and reducing flow friction.

At one end of the reservoir or storage tank may be an inlet port 2; at the other end may be another inlet port 3 and an outlet port 4. In fluid communication with the ports 3 and 4 and coupled in series by a plurality of pipes, are a pump 5, a filter 6, and a linear solenoid valve assembly 7; these form a fluid recirculation path, as shown by arrows, for recirculating fluid through the reservoir 1. The pump 5 may be any of several commercially available pumps which is compatible with the fluid used and sufficient for providing a positive pressure in the system. The filter 6 may be any of several commercially available filters which is compatible with the fluid used and adequate to provide the necessary filtering. On the other hand, the liner solenoid valve 7 is specially designed and so made as to produce a uniform amount of force throughout the length of its stroke for a given input current or applied voltage and to vary the force in accordance with the voltage variations for controlling fluid flow in the recirculation path and the fluid pressure and volume of fluid flow throughout the system as a linear function of temperature in the system. This valve 7 will be described in more detail below with respect to FIGS. 2 and 3.

In between the filter 6 and the solenoid valve 7, and in fluid communication therewith by means of a pipe 8, is a pressure relief valve 9. The valve 9 may be one of several commercially available pressure relief valves and is adjusted to open at a predetermined pressure for the passage of fluid from the reservoir 1 through the valve 9 and then through a pair of heat exchangers 20 and 21 via a pipe 22, which is joined to a pair of parallel pipes 23 and 24, respectively. The pressure at which the valve 9 opens is slightly above the pressure normally in the recirculation path when the valve 7 is wide open. This insures that no fluid will flow from the reservoir 1 through the heat exchangers 20 and 21 until the valve 7 begins to close, thus insuring rapid warm-up of the primary engine 30.

The heat necessary for boiling and vaporizing the fluid received from the reservoir 1 in the heat exchangers 20 and 21 is preferably provided by an internal combustion engine 30. The engine 30, shown simply as a block in FIG. 1, may be any of several types of internal combustion engines including those commmonly designated as gasoline, turbine, and diesel engines. Moreover, certain types of external combustion engines, such as a primary steam engine, may also be adapted for use with the auxiliary power system of the present invention. The principal factor determining whether or not a given engine may be suitable depends on whether or not it or the accessories which it drives generates or otherwise exhausts heat which can be used to generate vapor that can provide auxiliary power to drive the engine.

While recognizing that certain internal combustion engines are air cooled, as distinguished from liquid cooled, the present invention is described with respect to its use with a liquid-cooled engine, it being understood that its use with an air-cooled engine would principally involve the omission of the heat exchanger 21 and associated piping. In certain applications both air and liquid-cooled engines may be used to drive accessories such as air-conditioning systems, transmissions, after-coolers, etc., each of which generates heat. If sufficient, the heat generated by operation of such devices and the like (not shown) may also be coupled to one or more heat exchangers for the generation of vapor, as more fully described below with respect to the heat exchangers 20 and 21.

As in all liquid-cooled internal combustion engines, the engine 30 is provided with an internal chamber (not shown) through which is circulated a liquid coolant, such as water, a mixture of water and anti-freeze, or pure anti-freeze. In the system of the present invention pure anti-freeze is preferably employed to obtain the highest boiling point possible in comparison to the boiling point of the fluid in the reservoir 1. A maximum boiling point differential is desirable for obtaining maximum heat transfer in the heat exchanger 21. Normally, the coolant is circulated through the internal chamber about the engine cylinders and an external radiator. Such a radiator, being one form of heat exchanger, cools the circulating liquid by transferring heat therefrom to air passing through the radiator. With the apparatus of the present invention, however, the conventional radiator is preferably omitted, and a pair of pipes 31 and 32 is provided for circulating the liquid from the internal liquid chamber in the engine 30 through the heat exchanger 21. Similarly, the hot gases from the engine 30 are exhausted from and routed through the heat exchanger 20 by means of a pipe 33. In each case the heat from the liquid in the pipe 31 and the heat from the exhaust gases in the pipe 33 are transferred to the fluid from the reservoir 1 and cause the fluid coming from the reservoir 1 as a liquid to boil and vaporize in the respective heat exchangers while at the same time providing the necessary cooling of the engine parts. The specific construction and operation of a preferred type of heat exchanger will be described more fully hereinafter with respect to FIG. 4.

Coupled to the outputs from which the vapor issues from the heat exchangers 20 and 21 is a pair of pipes 40 and 41. The pipes 40 and 41 are coupled in parallel to a pair of pipes 42 and 43. The pipe 42 is coupled to the input of a vapor engine 50. The pipe 43 is coupled to a safety valve 51. The vapor engine 50 may be any of several types of so-called steam engines, but is preferably a type commonly known as a rotary vane type vapor (or steam) engine. The valve 51 may be any of several commercially available pressure-activated valves adjusted to open at a predetermined steam pressure.

The vapor engine 50 is coupled to the crankshaft or other suitable component of the engine 30 by means of an overrunning clutch assembly 52. The overrunning clutch assembly 52 typically comprises a mechanical coupling between the engines 30 and 50 enabling the transfer of power from the engine 50 to the engine 30, but it does not transfer power in the reverse direction from the engine 30 to the engine 50. Thus, the engine 30 is never loaded down by having to drive engine 50 when, on certain occasions, as when the engine 30 is cold, the engine 50 has insufficient steam for driving the engine 30.

Figures 7, 8, 9:
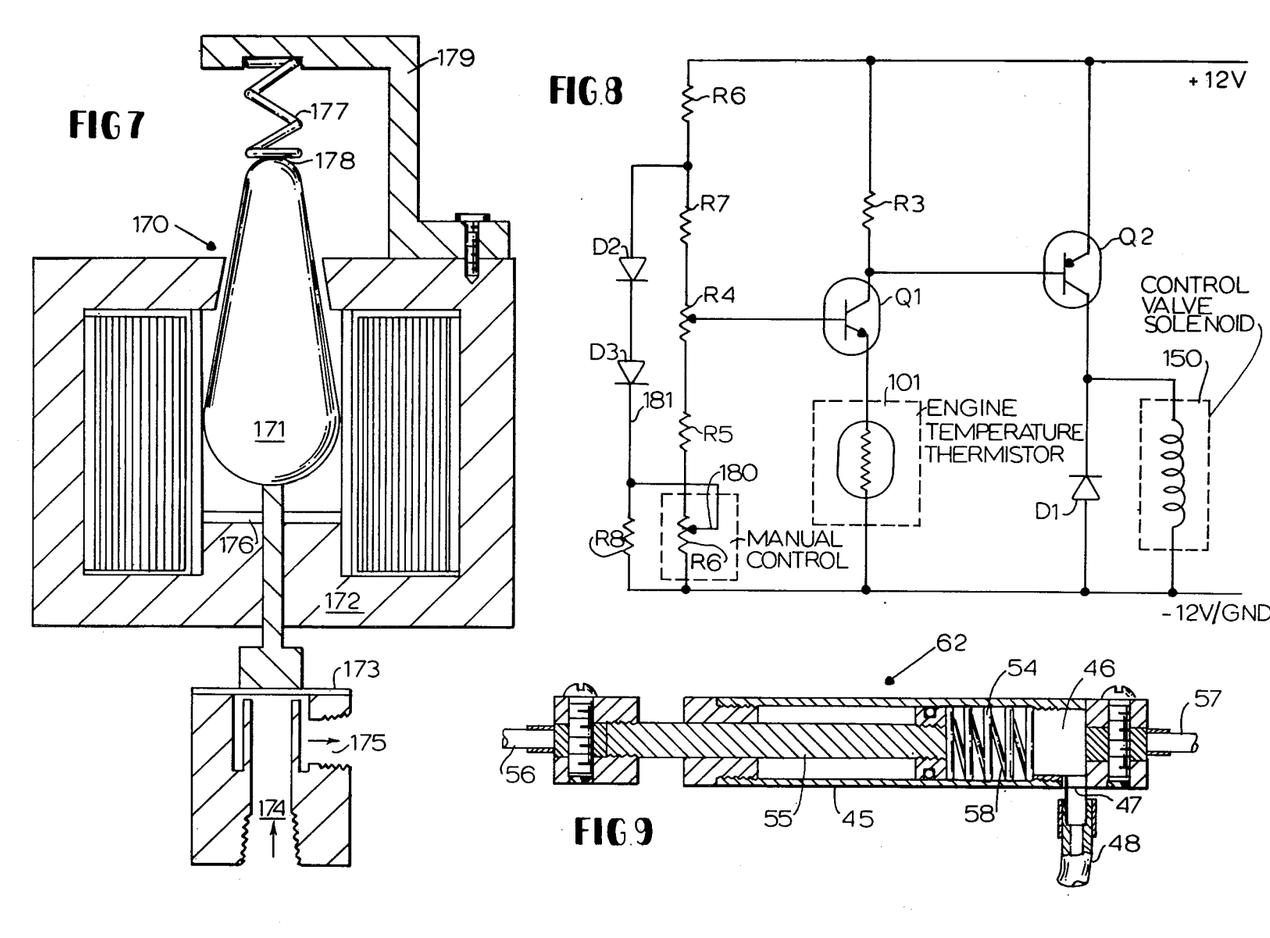
FIG. 7 is a view in section of another modified form of the solenoid valve.
FIG. 8 is a circuit diagram of a modified form of the electrical system connecting the solenoid valve to the temperature detector.
FIG. 9 is a view in section of a vacuum responsive throttle device useful in the invention.

Coupled to the input of the auxiliary engine 50 at the end of the pipe 41 is a mechanically or vacuum operated throttle valve assembly 60. The assembly 60 comprises a throttle valve 61 and a throttle control 62. The throttle valve 61 comprises a throttle plate (not shown) for opening and closing the pipe 41 in a conventional manner — i.e., in much the same manner as the throttle plate in the carburetor of a conventional internal combustion engine. The throttle control 62 is mechanically coupled to the throttle plate in the valve 61 and to either the carburetor throttle plate or the intake manifold of the engine 30, as illustrated by the dashed lines. The control 62 is fixed in such a manner as to open the throttle plate in the valve 61 simultaneously with the opening of the throttle plate in the carburetor. Indeed, it is preferable that the throttle plate in the valve 61 open fully upon any opening of the carburetor throttle plate, in order to provide maximum auxiliary power for acceleration. As is well known, the opening of the throttle plate in the carburetor is accompanied by a reduction of vacuum in the intake manifold. If a vacuum rather than a mechanical control is preferred, this reduction in vacuum may be used to operate the control 62. When so employed, a cylinder and piston responsive to changes in the intake manifold pressure are used. The piston and cylinder are coupled by a mechanical linkage to the throttle plate and will open the throttle plate of the valve 61 when the vacuum drops in the intake manifold in a conventional manner. A type of vacuum operated piston is shown in FIG. 9.

A cylindrical housing 45 incorporating a chamber 46 having a port 47 is connected by tubing 48 to the intake manifold of the engine 30. In the housing 45 is a piston 54 having a piston rod 55 secured to a throttle linkage 56, and the opposite end of the cylinder housing 45 is secured to a throttle linkage 57. A coil spring 58 in the chamber biases the piston 54, namely to the left in FIG. 9, the effect of the spring 58 being to lengthen the throttle linkage 56, 57. The throttle 61 for the vapor engine is wide open when the piston 54 is forced all the way to the left in FIG. 9 by the spacer 58. The piston 54 is moved to the right in FIG. 9 by increasing vacuum in the intake manifold of the engine 30, thereby closing the throttle 61 and controlling the idling speed of the vapor engine 50.

Coupled to the exhaust port of steam engine 50 and the down-stream end of valve 51 is a pair of pipes 63 and 64. The pipes 63 and 64 are connected in series with a condenser 65 and a pump 66 of conventional construction to the inlet port 2 of the reservoir 1 by means of a pair of pipes 67 and 68, thus completing the plumbing for the circulation of the fluid in the reservoir 1 throughout the system.

Figure 2:
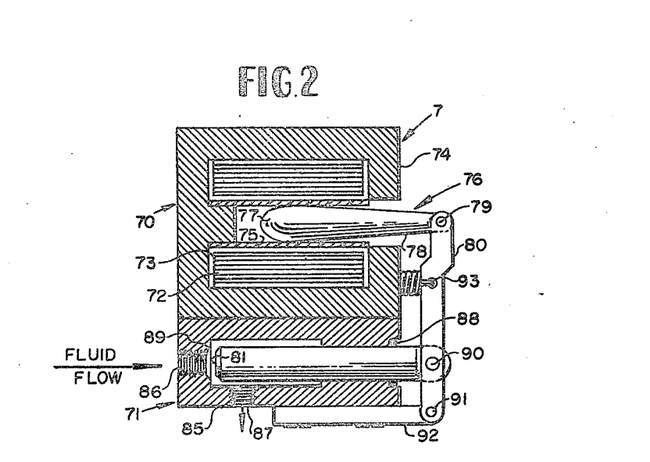
FIG. 2 is a view in cross-section of a novel linear solenoid valve used in the system of FIG. 1.

The Solenoid Valve of FIG. 2

It is important for the efficient operation of the system of the present invention that changes in the volume and pressure of the fluid flowing from the reservoir 1 be a linear function of the temperature of the system. In a conventional solenoid, the force on the solenoid armature for a given current is a function of the position of the armature in the solenoid. As a consequence, the pressure and volume of a fluid flowing through a valve controlled by a conventional solenoid, or indeed any device controlled by means of a conventional solenoid, cannot be controlled normally as a linear function of the current or voltage applied to the solenoid.

FIG. 2 shows in cross-section an embodiment of the novel linear solenoid control valve 7 of the present invention which is coupled to the reservoir 1. The valve 7 has a solenoid portion 70 and a valve portion 71. In the solenoid portion 70 is a hollow core coil 72 of wire wound on the aluminum spool 73 inside a steel housing 74. Inside the spool 73 is a plastic sleeve or bearing 75 for slidably receiving a steel armature 76.

The armature 76 is provided at one end with a spherical radius 77, from which extends a generally conically-shaped main body portion 78. The apex of the body portion 78 is pivotably connected by means of a hinge pin 79 to one end of an elongated lever member 80 for coupling the armature 76 to a stainless steel valve rod or member 81 in the valve portion 70.

The valve portion 70 comprises a valve housing 85 having an inlet port 86 fitted with a valve seat 89 and an outlet port 87. The valve member 81 is slidably fitted in housing 85 in a fluid-tight fashion by means of an O-ring 88 or the like and is pivotably connected at its exterior end by means of a hinge pin 90 to an intermediate point of member 80. The opposite end of the member 80 is pivotably connected by means of a hinge pin 91 to an extended portion 92 of the housing 85. The mechanical relationship between the armature 76, the member 80, the valve member 81 and the various hinge pin connecting points described is such that the valve member 81 is seated on the valve seat 89 when the armature 76 is drawn into the core of solenoid portion 70. To overcome friction and open the valve in the absence of fluid pressure against the valve member 81, a spring member 93 is coupled to the lever member 80. Member 93 is shown as a compression spring but may, of course, by any type of means suitable for or equivalent to member 93 for opening the valve.

Figure 3:
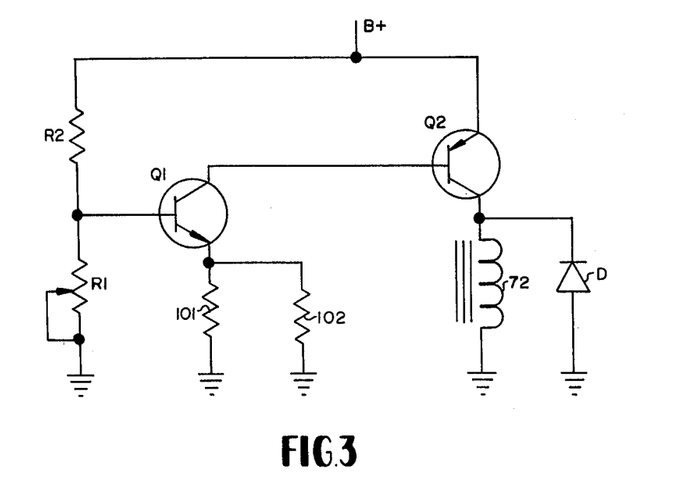
FIG. 3 is a circuit diagram of a dc amplifier for use in the system of FIG. 1 for driving the solenoid valve of FIG. 2.

The Amplifier of FIG. 3

To operate the valve 7, the coil 72 is preferably coupled, as seen in FIG. 1, to the output of a dc amplifier 100. The input of the amplifier 100 is coupled to a plurality of temperature-sensitive elements 101 and 102, such as, for example, thermistors. The element 101 is located in the pipe 31 or in any other suitable location for measuring the temperature of the liquid cooling system of the engine 30. The element 102 is located in the heat exchanger 20 or any other suitable location for measuring the temperature of the fluid from the reservoir 1 in the heat exchanger 20 or the temperature of the vapor issuing therefrom. Both elements 101 and 102 send out a signal which is amplified by the amplifier 100 for driving the solenoid valve 7.

FIG. 3 shows a suitable schematic diagram of a dc amplifier 100 and it connection to the thermistors 101 and 102 and the valve 7. As shown in FIG. 3, there is provided a pair of transistors Q1 and Q2. The base of Q1 is coupled to ground through a potentiometer R1, as of 100 ohms, and to a B+ supply, as of 12 volts, through a resistor R2, as of 430 ohms. The emitter of Q1 is coupled to ground through thermistors 101 and 102, both of which are provided with a range of variable resistance as a function of temperature of 20-1000 ohms. The collector of Q1 is coupled to the base of Q2. The emitter of Q2 is coupled to the B+ supply. The collector of Q2 is coupled to ground through the solenoid coil 72 and a diode D.

Figure 4:
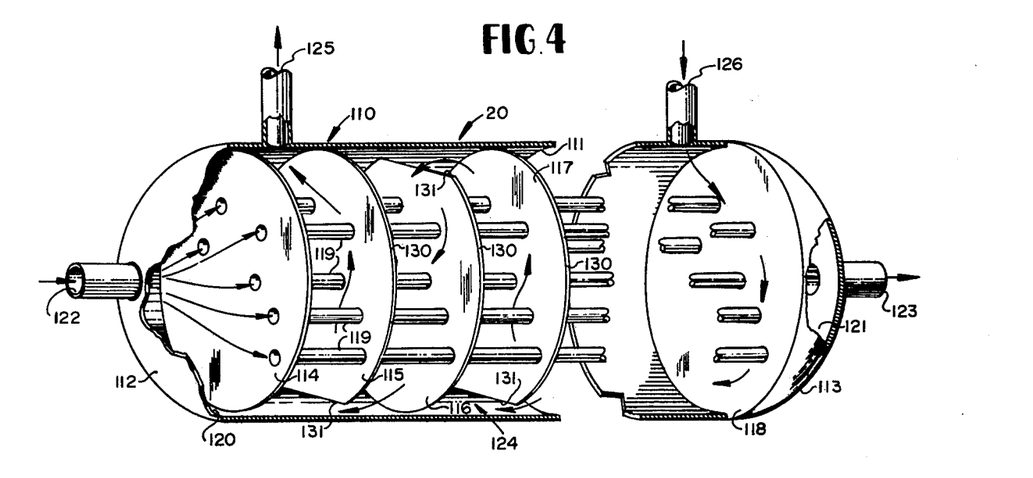
FIG. 4 is a broken-away perspective view of a heat exchanger used in the system of FIG. 1.

The Heat Exchangers of FIG. 4

FIG. 4 shows in more detail the heat exchanger 20, it being understood that the heat exchanger 21 and any other heat exchanger used in the system may have substantially the same construction. In the heat exchanger 20 there is provided a housing 110 having a generally cylindrical interior wall surface 111 and a pair of dome-shaped end portions 112 and 113. Interior of housing 110 is a plurality of spaced plate members 114, 115, 116, 117 and 118 and a plurality of spaced tubular members 119. The plate members 114 and 118 are positioned in the end portions 112 and 113 for forming a pair of fluid-tight end chambers 120 and 121 having an inlet port 122 and an outlet port 123, respectively, and an interior chamber 124 having an inlet port 126 and an outlet port 125, respectively. The plate members 115, 116 and 117 are positioned in the chamber 124 is between the plate members 114 and 118. While each of plate members 114 and 118 forms a fluid-tight seal with the interior wall surface 111, each of interior plate members 115, 116 and 117 is provided with a first peripheral edge portion 130 which conforms to and is contiguous with the interior wall surface 111 and a second peripheral edge portion 131 which is spaced from the surface 111 for providing a fluid passageway between the plate 115, 116 and 117 and the surface 111. The plates 115, 116 and 117 are further positioned within the chamber 124 such that the fluid passageways formed by the peripheral edges 131 and wall surface 111 are angularly disposed relatively to each other so as to provide a circuitous path for the fluid passing through the chamber 124 about the tubular members 119 from right to left, as shown by the arrows in the chamber 124.

In considering the flow of liquids and gases in the heat exchangers, it is also believed important to note that the direction of flow in the tubular members 119 is counter to the flow in the chamber 124. Thus, as the fluid in the members 119 flows from left to right and is heated, it encounters ever-increasing temperatures from the hot liquids and gases in the chamber 124, entering the input port 126 and flowing from right to left. In this fashion maximum and more uniform thermal gradients are maintained throughout the length of the heat exchanger and more efficient operation is achieved.

Operation of the Device of FIGS. 1-4

In operation, initially, the internal combustion engine 30, for purposes of description, is considered to be cold. Given this initial condition, the valve 7 is biased open by the spring member 93, the valve 9 is closed, and fluid is recirculated through the reservoir 1 by means of the pump 5 for rapid warm-up.

As the engine 30 warms up, the temperature of the exhaust rises, as does the temperature of the liquid provided for cooling the engine 30. As these temperatures continue to rise, the valve 7 under the control of the thermistors 101 and 102 begins to close, causing a rise in the fluid pressure in the pipe 8. Due to the conical shape of the armature 76 in the valve 7, the force on the armature 76, is provided to be a linear function of the applied voltage and independent of the position of the armature 76 in the solenoid 7. Consequently, the travel of the armature 76 is substantially linear with respect to the output of the amplifier 100. This linear movement of the armature 76 is reflected in a corresponding movement of the valve member 81 and thereby provides a linear control of the fluid flow through the valve 7. As the pressure in the line 8 rises, the valve 9 opens and fluid from the reservoir 1 flows as a liquid to the input port 122 and then through the tubular members 119 of the heat exchangers 20 and 21.

In the heat exchangers 20 and 21, the liquid (fluid) from the reservoir is boiled and vaporized by the heat of the gases and liquid, respectively, passing through the tubular chamber 124. The resulting vapor is thereafter routed via the outlet port 123 and the pipes 40 and 41 to the input port of the vapor engine 50, through the throttle valve 61. If the throttle of the engine 30 is open, the throttle valve 61 is open, due to the operation of the throttle control 62, and maximum power is provided by the engine 50 to the engine 30 via the overrunning clutch 52. If, on the other hand, the engine 30 is idling, both the throttles of the engines 30 and 50 are closed or nearly closed, so that vapor pressure will build up. When, under these conditions, the vapor pressure reaches a predetermined magnitude, the valve 51 opens and the vapor passes into the condenser 65, wherein it is condensed. The resulting liquid from the condenser 65 is thereafter pumped by the pump 66 to replenish the reservoir 1. If the vapor engine 50 is operating, it is obvious that the vapor engine exhaust will also pass to the reservoir 1 through the condenser 65.

Figure 5:
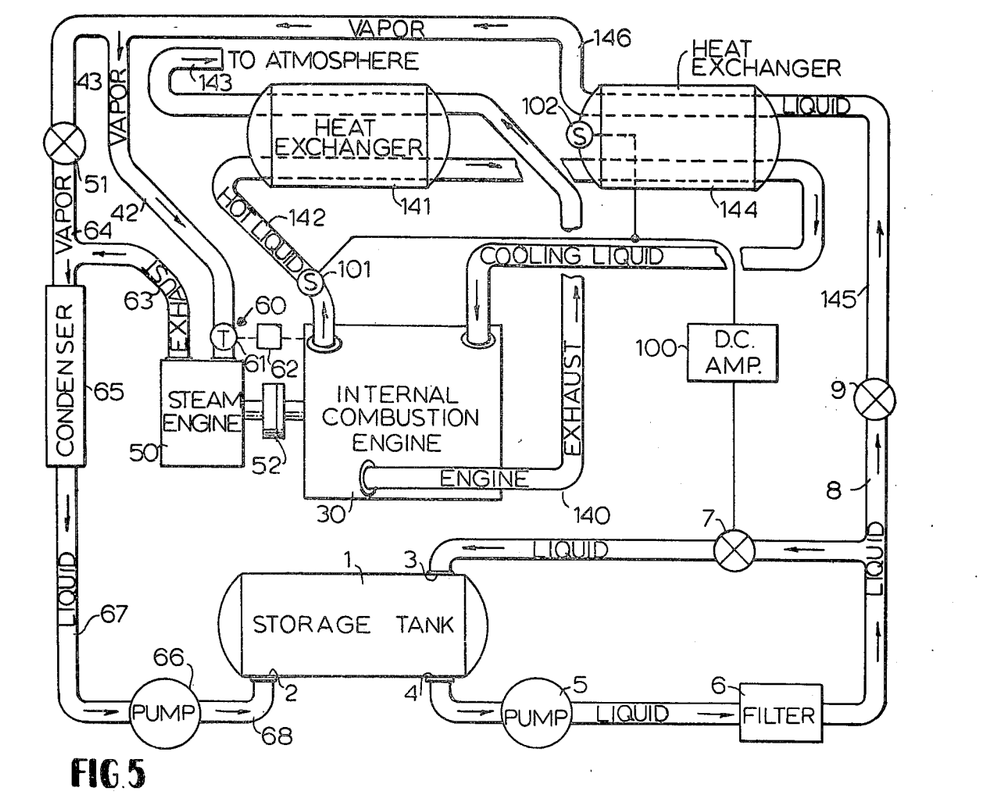
FIG. 5 is a schematic view of a modified form of power system also embodying the principles of the invention and employing a somewhat different heat exchange system.

The System of FIG. 5

In some instances, it may be undesirable for the engine exhaust gas to be placed in heat exchange relation directly with the FREON or other such fluid, as shown in FIG. 1 at the heat exchanger 20. Undesirable hot spots may develop.

In the FIG. 5 system, the engine exhaust pipe 140 from the engine 30 goes through a heat exchanger 141 in heat-exchange relation with the already-heated liquid coolant coming from the engine 30 via a pipe 142. The cooled exhaust pipe is then vented to atmosphere via the pipe 143, whereas the further-heated coolant is carried by the pipe 142 to a second heat exchanger 144. There the coolant gives up its heat to the FREON, which enters as a liquid through a pipe 145 and leaves as a vapor through the pipe 146. The engine operation is otherwise basically that already described.

Figure 6:
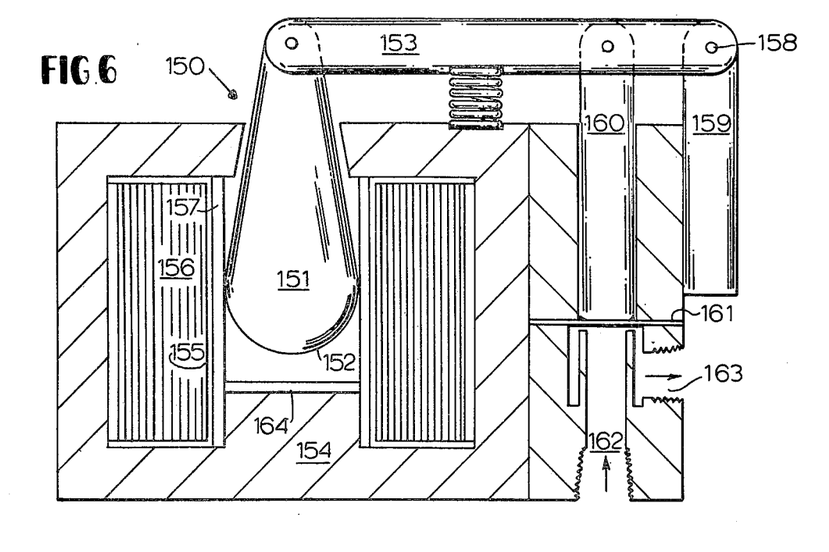
FIG. 6 is a view in section of a modified form of the solenoid valve forming part of the invention.

The Solenoid Valve 150 of FIG. 6

The solenoid valve 7 may be replaced with the basically similar valve 150 of FIG. 6. Again, a magnetic armature 151 is shaped conically with a hemispherical end 152 and is provided to a non-magnetic lever 153 for movement inside a core 154 having a spool 155 with a wire winding 156 and a plastic bearing 157. The lever 153 is pivoted at 158 to a stationary member 159, and a valve stem 160 is pivoted to the lever 153. The stem 160 acts on a diaphragm 161 to control the fluid flow between an inlet port 162 and an outlet port 163. Again, the outlet port 163 is cut off until a desired temperature is reached in the engine coolant. To prevent damage to the diaphragm 161 a non-magnetic stop 164, which may be aluminum or plastic, is used to limit inward movement of the armature 151.

The Solenoid Valve 170 of FIG. 7

Another usable valve 170 has an armature 171 like that of FIG. 6 but with an extension that extends out through a non-magnetic stop 176 and the solenoid's core 172 and directly engages a diaphragm 173 controlling the passage of fluid from an inlet port 174 to an outlet port 175. A tension spring 177 is secured to the small end 178 of the armature 171 and also to a non-magnetic support 179 which may be secured to the body 172. The operation is basically the same as that of the valve 150.

While the armatures 151, 171, and 76 are shown as round and conical, it is feasible to employ armatures that are pyramidal or otherwise tapered. The taper is the important thing. The end shown as spherical can be otherwise shaped also, as by chamfering a prism.

The Amplifier Circuit of FIG. 8

An improved amplifier circuit is shown in FIG. 8. Again transistors Q1 (e.g., a 2N2219) and Q2 (e.g., a 2N6050) are used, connected as before in general. However, the +12 volt bus is here connected to the collector of Q1 and the base of Q2 through a resistor R3 (e.g., 1600 ohms), and the base of Q1 is connected to a variable resistor R4 (e.g., of 2000 ohms). The resistor R4 is connected to ground via a resistor R5 (e.g., 5600 ohms) and, if desired, a variable, manually controlled rheostat R6. The +12 volt bus is connected to the resistor R4 via a resistor R7 (e.g., 3000 ohms) and a resistor R8 (e.g., 3300 ohms).

A variable tap 180 of the rheostat R6 is connected to a line 181 in parallel with the resistors R7, R4, R5 and R6 and is grounded through a resistor R8 (e.g., 40 ohms). The line 181 is connected between the resistor R6 and the resistor R7 and includes two diodes D2 and D3 (like the diode D, there may be IN4003). The diodes D2 and D3 lengthen the life of the transistors Q1 and Q2; without these the reverse current from the solenoid 150 when the current is turned off tends to burn out the transistors. Also, the amplification factor is larger than for the circuit of FIG. 3.

While described with respect to a specific embodiment employing a certain number of novel components, it is understood that one or more of the novel components described may be replaced by conventional components without departing from the spirit and scope of the invention. It is also to be understood that various combinations of the conventional components described may also be used interchangeably with other conventional components and that various other changes may be made in materials and in arrangement of the parts. Accordingly, the description of the preferred embodiment provided herein is intended only for purposes of illustration and should not be interpreted as limiting the invention as hereinafter claimed.

What is claimed is:

1. A solenoid valve for fluid flow control, comprising:
    a solenoid having
        a field coil including a wire winding surrounding a non-magnetic bearing sleeve defining a hollow core open at its outer end, a magnetic metal housing surrounding the winding, and a flat magnetic metal surface adjacent the inner end of the hollow core, perpendicular to the axis of the hollow core;
    an armature movable within said core in response to current in said field coil, said armature comprising a body member including a first generally hemispherical portion providing an enlarged end and a second conical portion extending therefrom and leading to a small end, said armature being oriented with the large end within the field coil and the small end extending outside the field coil such that the flow of current through the field coil tends to draw the armature farther in large end first;
    said armature shape and orientation providing a power output that is substantially constant relative to armature position, so that power output is a substantially linear function of said current through substantially the entire stroke of the armature;
    a valve body having a valve seat;
    a valve member movably located in said valve body; and
    valve control means connecting said valve member to said armature for moving said valve member to and from said valve seat to control fluid flow therethrough.

2. A solenoid valve for fluid flow control, comprising:
- a solenoid having a field coil with a hollow core open at its outer end, wire winding surrounding the core, magnetic metal surrounding the winding, and a flat magnetic metal surface adjacent the inner end of the hollow core;
- an armature movable in a stroke in the core in response to current in the field coil, said armature being shaped as a steadily tapered body with a large end and a small end, the armature being oriented with the large end within the field coil and the small end extending outside the field coil such that the flow of current through the field coil tends to draw the armature farther into the core, large-end first, said armature and field coil providing an armature power output that is substantially constant relative to armature position, so that power output is a substantially linear function of said current through the entire stroke of the armature;
- a valve body having a valve seat;
- a valve member movably located in the valve body; and
- valve control means connecting the valve member to the armature for moving the valve member to and from the valve seat to control fluid flow therethrough.

* * * * *